(12) United States Patent
Petrillo et al.

(10) Patent No.: US 6,169,285 B1
(45) Date of Patent: Jan. 2, 2001

(54) RADIATION-BASED IMAGING SYSTEM EMPLOYING VIRTUAL LIGHT-RESPONSIVE ELEMENTS

(75) Inventors: Michael J. Petrillo, Pleasanton, CA (US); Paul Vaska, Ridley Park, PA (US)

(73) Assignee: ADAC Laboratories, Milpitas, CA (US)

( * ) Notice: Under 35 U.S.C. 154(b), the term of this patent shall be extended for 0 days.

(21) Appl. No.: 09/178,264

(22) Filed: Oct. 23, 1998

(51) Int. Cl.$^7$ ..................................................... G01T 1/20

(52) U.S. Cl. .................. 250/369; 250/366; 250/363.02

(58) Field of Search .................... 250/370.11, 370.09, 250/370.13, 369, 366, 363.02

(56) References Cited

U.S. PATENT DOCUMENTS

| | | |
|---|---|---|
| 4,071,761 | 1/1978 | Horrocks . |
| 4,181,855 | 1/1980 | Horrocks . |
| 4,418,282 | 11/1983 | Horrocks . |
| 5,296,708 | 3/1994 | Moyers et al. . |
| 5,444,252 | 8/1995 | Hug et al. . |
| 5,461,232 | 10/1995 | McCandless et al. . |
| 5,471,061 | 11/1995 | Moyers et al. . |
| 5,493,120 | 2/1996 | Geagan . |
| 5,552,606 | 9/1996 | Jones et al. . |
| 5,565,684 | 10/1996 | Gullberg et al. . |
| 5,585,637 | 12/1996 | Bertelsen et al. . |
| 5,608,221 | 3/1997 | Bertelsen et al. . |
| 5,646,408 | 7/1997 | Goldberg et al. . |
| 5,841,833 | * 11/1998 | Mazess et al. .................. 250/370.09 |
| 5,847,398 | * 12/1998 | Shahar et al. .................. 250/370.09 |

OTHER PUBLICATIONS

James A. Sorenson, Ph.D., et al., *Physics in Nuclear Medicine*, W.B. Saunders Company, 2nd Ed., Philadelphia, 1987, pp. 438–442.

Robert Anthony Dekemp, B.A.Sc., Attenuation Correction Positron Emission Tomography Single Photon Transmission Measurement, Sep. 1992, McMaster Univ., Hamilton (ON), 106 pgs.

Siu K. Yu and Claude Nahmias, Single Photon Transmission Measurements in Positron Tomography Using $^{137}$Cs, 1995, McMaster Univ., Hamilton (ON), 29 pgs.

Karp, et al., Singles Transmission in Positron Emission Tomography Using $^{137}$Cs, from 1995 IEEE Nuclear Science Symposium and Medical Imaging Conference record vol. 13, University of Pennyvania and UGM Medical Systems (Philadelphia, PA), pp. 1363–1367.

P. Nellemann, et al., Performance Characteristics of A Dual Head Spect Scanner With Pet Capability, From 1995 IEEE Nuclear Science Symposium conference record vol. 3, ADAC Laboratories and UGM Laboratory, pp. 1751–1755.

(List continued on next page.)

*Primary Examiner*—Constantine Hannaher
*Assistant Examiner*—Otilia Gabor
(74) *Attorney, Agent, or Firm*—Blakely, Sokoloff, Taylor & Zafman LLP

(57) ABSTRACT

A method and apparatus are provided for detecting scintillation events in a gamma camera detector using virtual photomultiplier tubes (PMTs). The gamma camera detector includes multiple real PMTs within the actual field of view of the detector as well as multiple virtual PMTs defined outside the actual field of view. In response to a scintillation event occurring near the edge of the field of view, one of the real PMTs responding to the event is identified. The event is then mapped to one or more virtual PMTs based on the identified real PMT. Data representing a response of the virtual PMT is then generated based on a response of a corresponding one of the real PMTs. Data representing responses of both the affected real PMTs and selected ones of the virtual PMTs are used in a centroid computation for the event, to increase the effective field of view of the detector.

35 Claims, 15 Drawing Sheets

OTHER PUBLICATIONS

Karp, et al., Singles Transmission in Volume–Imaging Pet With A $^{137}$Cs Source, *Phys. Med. Biol.,* vol. 40, 1995, pp. 929–944.

Bailey, et al., Ecart Art–A Continuously Rotating Pet Camera: Performance Characteristics, Initial Clinical Studies, And Installation Considerations In A Nuclear Medicine Department, *European Journal of Nuclear Medicine,* vol. 24, No. 1, Jan. 1997, London (UK) and Knoxville (TN), 10 pgs.

Robert A. De Kemp, et al., Attenuation Correction in Pet Using Single Photon Transmission Measurement, *Med. Phys.,* vol. 21, No. 6, Jun. 1994, pp. 771–778.

G. Muehllehner, et al., "Performance Parameters of a Positron Imaging Camera," IEEE Transactions on Nuclear Science, vol. NS–23, Feb. 1976, pp. 528–537.

R.A. De Kemp, et al., Design and Performance of 3D Photon Transmission Measurement on a Positron Tomograph With Continuously Rotating Detectors, International Meeting on Fully Three–Dimensional Image Reconstruction in Radiology and Nuclear Medicine, 1995, Ottowa and Hamilton (ON), Knoxville (TN), pp. 51–54.

Gerd Muehllehner, Positron Camera with Extended Counting Rate Capability, *Journal of Nuclear Medicine,* vol. 15, No. 7, Jul. 1975, pp. 653–657.

Karp et al., Continuous–Slice Penn–Pet: A Positron Tomograph with Volume Imaging Capability, *Journal of Nuclear Medicine,* vol. 13, No. 5, May 1990, pp. 617–627.

R.J. Smith et al., "Singles Transmission Scans Performed Post–Injection for Quantitative Whole Body Pet Imaging," 1996 IEEE Nuclear Science Symposium Conference Record, vol. 3, Nov. 1996, Philadelphia (PA), 7 pgs.

Karp, et al., Abstract No. 156 From proceedings of the 41st Annual Meeting, Scientific Papers, vol. 35, No. 5, Attenuation Correction in Pet Using A Singles Transmission Source, May 1994, Philadelphia (PA), p. 41P.

G. Muehllehner, et al., Abstract No. 284, From Proceedings of the 42nd Annual Meeting, Scientific Papers, Spect Scanner With Pet Coincidence Capability, *Journal of Nuclear Medicine,* Jun. 14, 1995, p. 70P.

Glenn F. Knoll, University of Michigan, *Radiation Detection and Measurement,* Second Edition, John Wiley & Sons, Inc., New York, 1979, pp. 120–129 and 597–598.

James K. O'Donell, M.D., "Nuclear Medicine Camera Improves Image Quality and Patient Throughput", *Advance for Administrators in Radiology,* Aug. 1997, pp. 82–83.

Wong, W.H. et al., "A Scintillation Detector Signal Processing Technique with Active Pileup Prevention for Extending Scintillation Count Rates," *IEEE Nuclear Science Symposium and Medical Imaging Conference,* Albuquerque, New Mexico, Nov. 9–15, 1997, 5 pages.

Abstract, Wong, W.H. et al., "An Ultra–High Count–Rate Position Decoding and Energy Measuring Method for Cameras Using Anger Logic Detectors", *1997 IEEE Nuclear Science Symposium and Medical Imaging Conference,* Albuquerque, New Mexico, Nov. 9–15, 1997, p. 88.

Lewellen, Thomas K., et al., "Evaluation of a Clinical Scintillation Camera with Pulse Tail Extrapolation Electronics", *The Journal of Nuclear Medicine,* vol. 30, Sep. 1989, pp. 1554–1558.

P. Stentstrom et al., "A New Scalable Modular Data Acquisition System for SPECT (PET)", *IEEE Transactions on Nuclear Science,* vol. 45, No. 3, Jun. 1998, pp. 1117–1121.

International Commission on Radiation, Units and Measurements, "The Poisson Process", *Particle Counting in Radioactivity Measurements,* ICRU Report 52, Bethesda, MD, Nov. 1994, pp. 3–17.

Wong, Wai–Hoi, et al., "A High Count Rate Position Decoding and Energy Measuring Method for Nuclear Cameras Using Anger Logic Detectors", *IEEE Transactions on Nuclear Science,* vol. 45, No. 3, Jun. 1998, pp. 1122–1127.

D.–C. Yu, et al., "Extending the Usable Areas of Modular NaI(TI) Detector Using Crystal Treatment", *IEEE,* May 1998, 4 pages.

\* cited by examiner

| DTW[6] | | | | | | DTW[0] |
|---|---|---|---|---|---|---|
| 1 | 0 | 0 | 0 | 0 | 1 | 1 |

FIG. 8A

| PMT[2] | PMT[1] | PMT[0] | EVT[3] | EVT[2] | EVT[1] | EVT[0] |
|---|---|---|---|---|---|---|
| 0 | 0 | 1 | 0 | 0 | 0 | 1 |

FIG. 8B

RADIATION-BASED IMAGING SYSTEM EMPLOYING VIRTUAL LIGHT-RESPONSIVE ELEMENTS

FIELD OF THE INVENTION

The present invention pertains to the field of nuclear medicine. More particularly, the present invention relates to a technique for increasing the effective field of view of a radiation detector in a nuclear medicine imaging system.

BACKGROUND OF THE INVENTION

In nuclear medicine, images of internal structures or functions of a patient's body are acquired by using one or more gamma cameras to detect radiation emitted by a radio pharmaceutical that has been injected into the body. A computer system controls the gamma cameras to acquire data and then processes the acquired data to generate images. Nuclear medicine imaging techniques include single photon emission computed tomography (SPECT) and positron emission tomography (PET). SPECT imaging is based on the detection of individual gamma rays emitted from the body, while PET imaging is based on the detection of gamma ray pairs resulting from electron-positron annihilations and emitted in coincidence with each other. Accordingly, PET imaging is sometimes referred to as coincidence imaging. Nuclear medicine imaging systems, which are sometimes referred to as gamma camera systems, include dedicated SPECT systems, dedicated PET systems, and systems having dual PET/SPECT capability. Gamma camera systems with dual PET/SPECT capability are available from ADAC Laboratories of Milpitas, Calif.

Gamma camera detectors typically include a number of photomultiplier tubes (PMTs), which provide electrical outputs in response to scintillation events occurring within a scintillation crystal. Electronic circuits process the outputs of the PMTs to determine the position of each scintillation event. The PMT size and arrangement are chosen so that the light from one scintillation event spreads into several PMTs, and the event is typically positioned by calculating the signal-weighted average PMT position of the PMTs located near the event; this process may be referred to as the "centroid" method.

While this method generally is sufficiently accurate over most of the detector area, one long-standing problem associated with this method is poor position sensitivity near the edge of the detector. This problem is caused, at least in part, by the fact that there are no PMTs to sample the light that would have spread beyond the edges of the detector. The result is a region of the detector around the edges of its field of view which is practically unusable, reducing the overall sensitivity to the detection of photons. In addition, for PET systems with multiple fixed detectors, the result may be an increase in the size of regions of missing data ("gaps") between detectors. Image reconstruction can be complicated by these effects. Therefore, what is needed is a gamma camera system which overcomes these and other disadvantages of the prior art.

SUMMARY OF THE INVENTION

A method and apparatus are provided for detecting a radiation-induced event in a radiation detector using virtual detector elements. The radiation detector includes multiple real detector elements adapted to respond to radiation-induced events. At least one of the real detector elements responding to the event is identified. The event is mapped to at least one virtual detector element. Data representing a response of the real detector element(s) and data representing a response of the virtual detector element(s) are then used to represent the event.

In particular embodiments, the event may be a scintillation event, and the detector elements may be photomultiplier tubes (PMTs). The event may mapped to a particular virtual PMT based on the peak real PMT for the event. Data representing the response of a virtual detector element may be generated based on data representing the response of a corresponding one or more real detector element(s).

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 8A and 8B show two possible formats for a digital trigger word (DTW).

DETAILED DESCRIPTION

A method and apparatus for detecting scintillation events in a gamma camera detector using virtual photomultiplier tubes (PMTs) are described. Briefly, a gamma camera detector includes multiple real PMTs within the actual field of view of the detector. Multiple virtual PMTs are also defined at locations outside the actual field of view. In response to a scintillation event occurring near the edge of the field of view, one or more of the real PMTs responding to the event are identified. The event is then mapped to one or more virtual PMTs based on the identified real PMT(s). For each virtual PMT to which the event is mapped, data representing a response of that virtual PMT is generated based on the actual response of a corresponding one or more of the real PMTs. Data representing responses of both the affected real PMTs and the appropriate virtual PMTs are used in a position computation for the event. The result is an increase in the effective (useful) field of view of the detector.

The described technique is well-suited for use in a gamma camera system capable of both single-photon (SPECT) and coincidence (PET) imaging, as described below. However, this technique can also be used advantageously in a dedicated coincidence (PET) imaging system or in a dedicated SPECT system.

Figure 1:
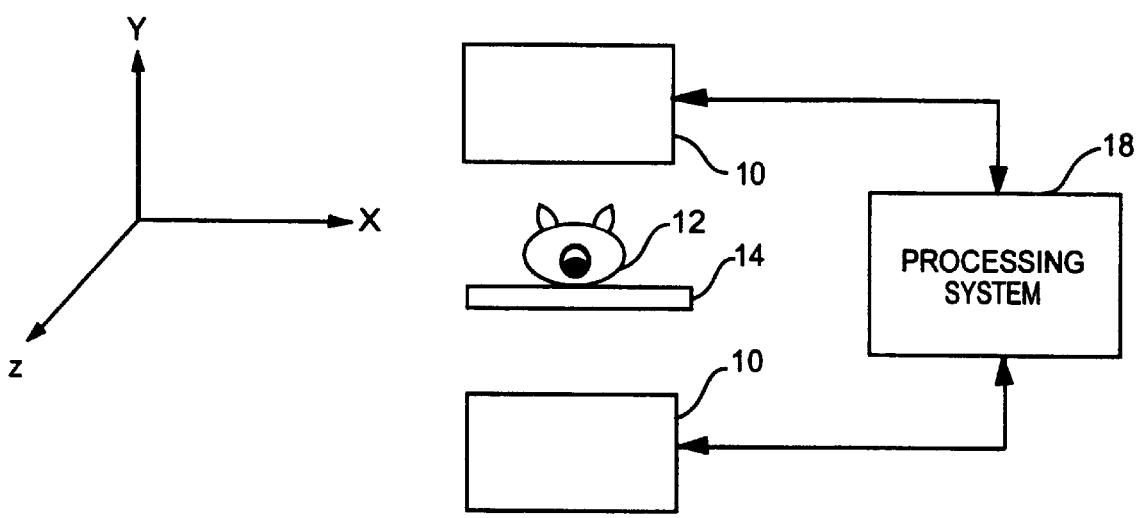
FIG. 1 is a block diagram of a gamma camera system.

FIG. 1 is a block diagram of a dual-detector gamma camera system capable of both single-photon and coincidence imaging. The system of FIG. 1 includes a processing system 18 coupled to two scintillation detectors 10. As will be described further below, each of the detectors 10 includes components for detecting scintillation events in response to gamma radiation and for providing data representing detected events to the processing system 18 via data signals. The detectors 10 may be supported by a gantry that is capable of rotating the detectors 10, either individually or in unison, about an axis of rotation that is perpendicular to the x-y plane (parallel to the z axis), and of moving the detectors along the z axis. A patient 12 rests on a table 14 positioned between the detectors 10. The detectors 10 are configured in a 180 degree orientation relative to each other about an axis of rotation that passes through the patient 12 parallel to the z axis, as is appropriate for coincidence imaging.

The processing system 18 controls the overall operation of the gamma camera system, including receiving data acquired by the detectors 10, processing the data, and reconstructing images based on the data. The processing system 18 controls certain functions of the detectors 10 using various control signals. The processing system 18 may be, or may include, for example, one or a combination of: a conventional computer system, such as a personal computer (PC), a server, a workstation, or a single-board computer. Note that in alternative embodiments, however, any of the above-mentioned functions of the processing system 18, or aspects thereof, may instead be implemented within the detectors 10, the gantry, or in other distinct modules. Thus, processing system 18 may actually be embodied as multiple distinct processing systems.

Figure 2:
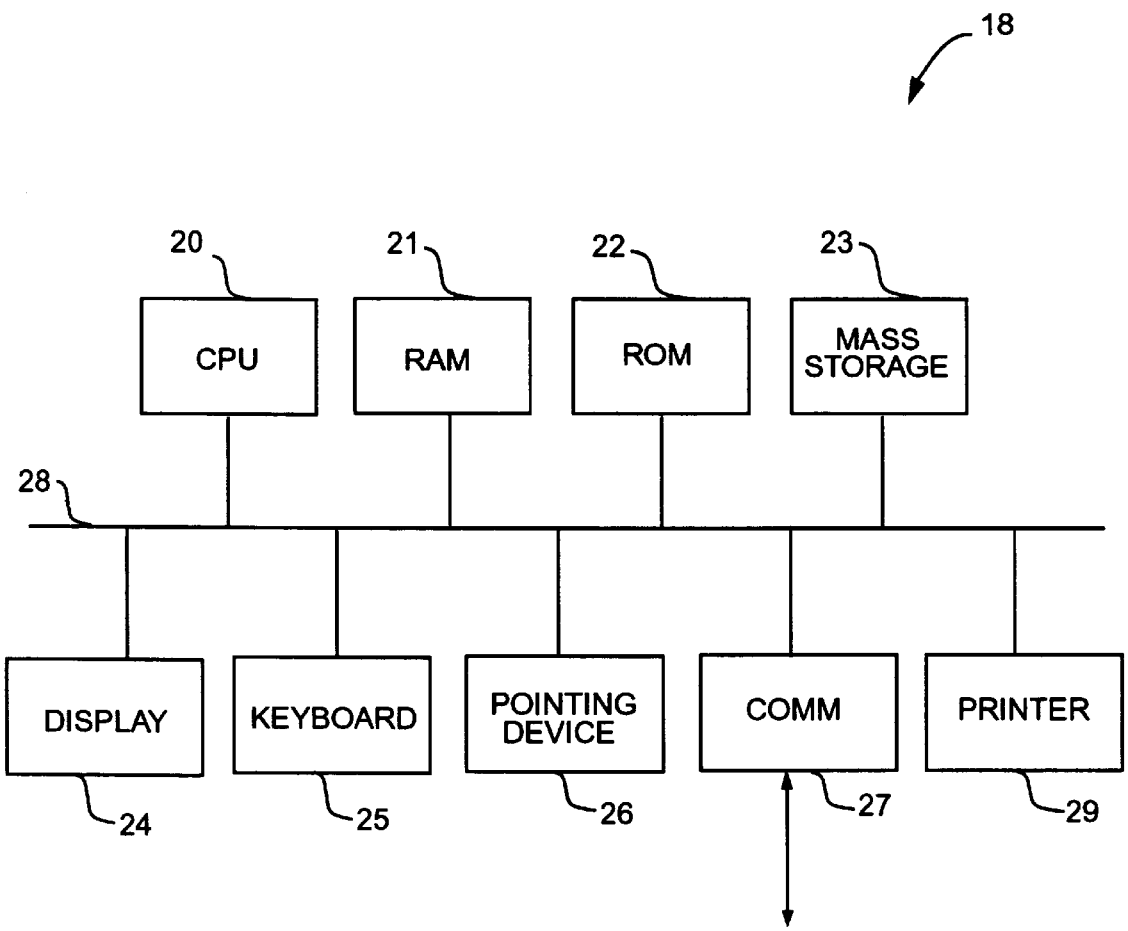
FIG. 2 is a block diagram of the processing system of the gamma camera system.

FIG. 2 illustrates a block diagram of the processing system 18 according to one embodiment. In the illustrated embodiment of FIG. 2, the processing system 18 includes a central processing unit (CPU) 20, random access memory (RAM) 21, read-only memory (ROM) 22, and a mass storage device 23, each coupled to a bus system 28. The bus system 28 may represent multiple physical buses coupled together by appropriate bridges, controllers, and/or adapters. Also coupled to the bus system 28 are a display device (including appropriate display controller) 24, which may be a cathode ray tube (CRT), liquid crystal display (LCD), or the like; a keyboard 25; a pointing device 26, such as a mouse, trackball, touchpad, or the like; a communication device 27; and a printer 29. Communication device 27 may be to implement the DATA and CTRL signals to and/or from the detectors 10 and/or other computer systems or components. Communication device 27 may be, for example, a simple transceiver, a network adapter, a modem, or any other suitable data communication device. Display device 24 and printer 29 may be used to display and print, respectively, tomographic images reconstructed by processing system 18.

Figure 3:
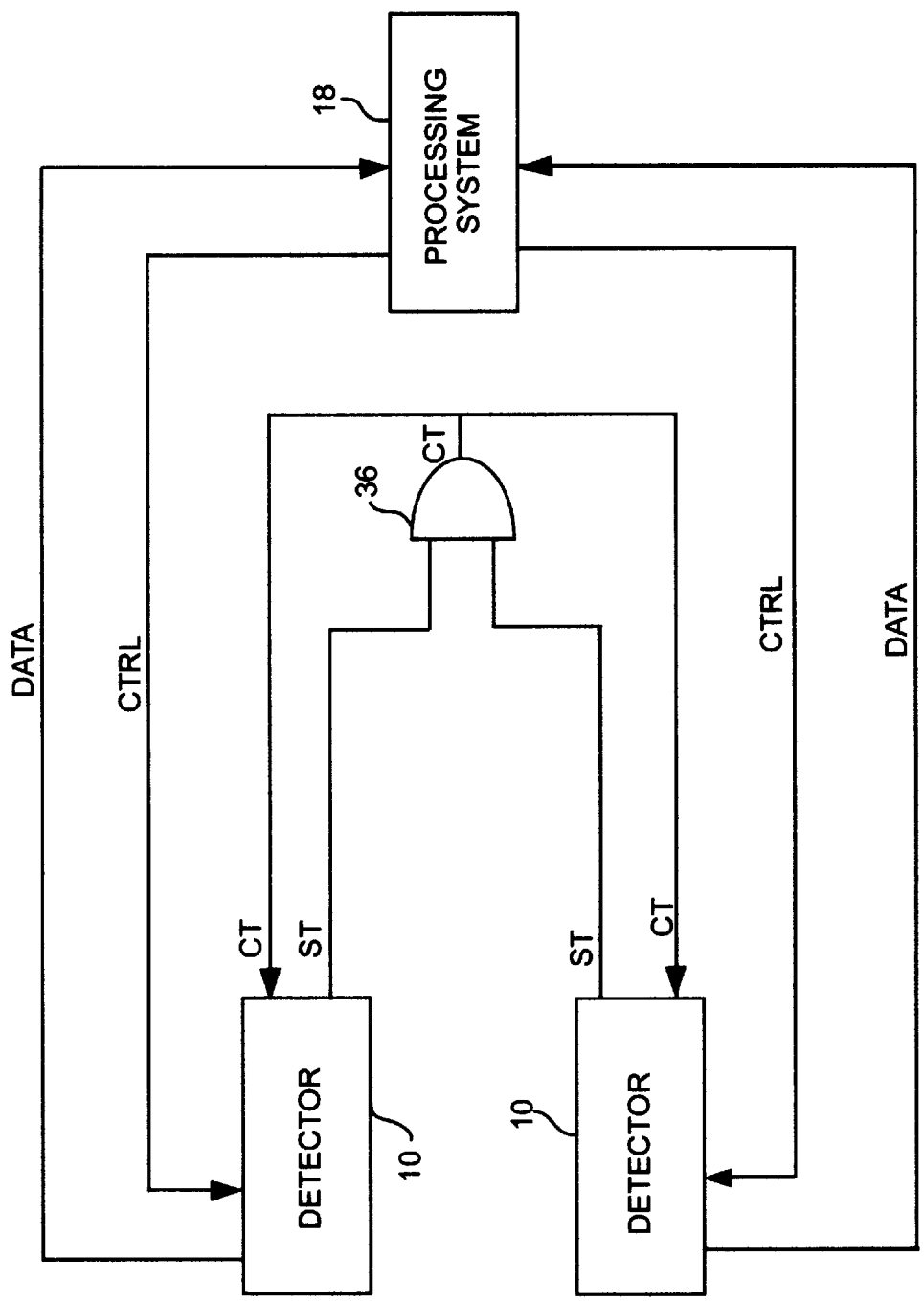
FIG. 3 is a block diagram of the gamma camera system showing the coincidence detection circuitry (CDC).

FIG. 3 illustrates the coincidence detection circuit of the gamma camera system, which enables the system to detect coincidence events. As shown, each of the detectors 10 outputs trigger pulses via singles trigger signals ST in response to each detected scintillation event. The singles trigger signal ST from each detector is applied to an input of the coincidence detection circuit (CDC) 36, which outputs a coincidence trigger signal CT to each of the detectors 10. The CDC 36 may be a simple AND gate, as shown on FIG. 3. When the system is in coincidence mode, each of the detectors 10 responds to assertion of the coincidence trigger signal CT by registering the position and energy of the corresponding scintillation event. When the system is in single-photon mode, each of the detectors 10 registers position and energy data in response to assertion of its singles trigger signal ST; the coincidence trigger signal CT is not used in that case. Position data (i.e., x,y coordinates) and energy data for registered events are provided by each of the detectors 10 to the processing system 18 via the DATA signals. The processing system 18 controls certain functions of the detectors 10 using various control (CTRL) signals. The CTRL signals may include clock signals for controlling data transfers, programming signals for programming variable delays, selecting the imaging mode (PET or SPECT) and other functions, and other signals, the specifics of which are not germane to the present invention.

Figure 4A:
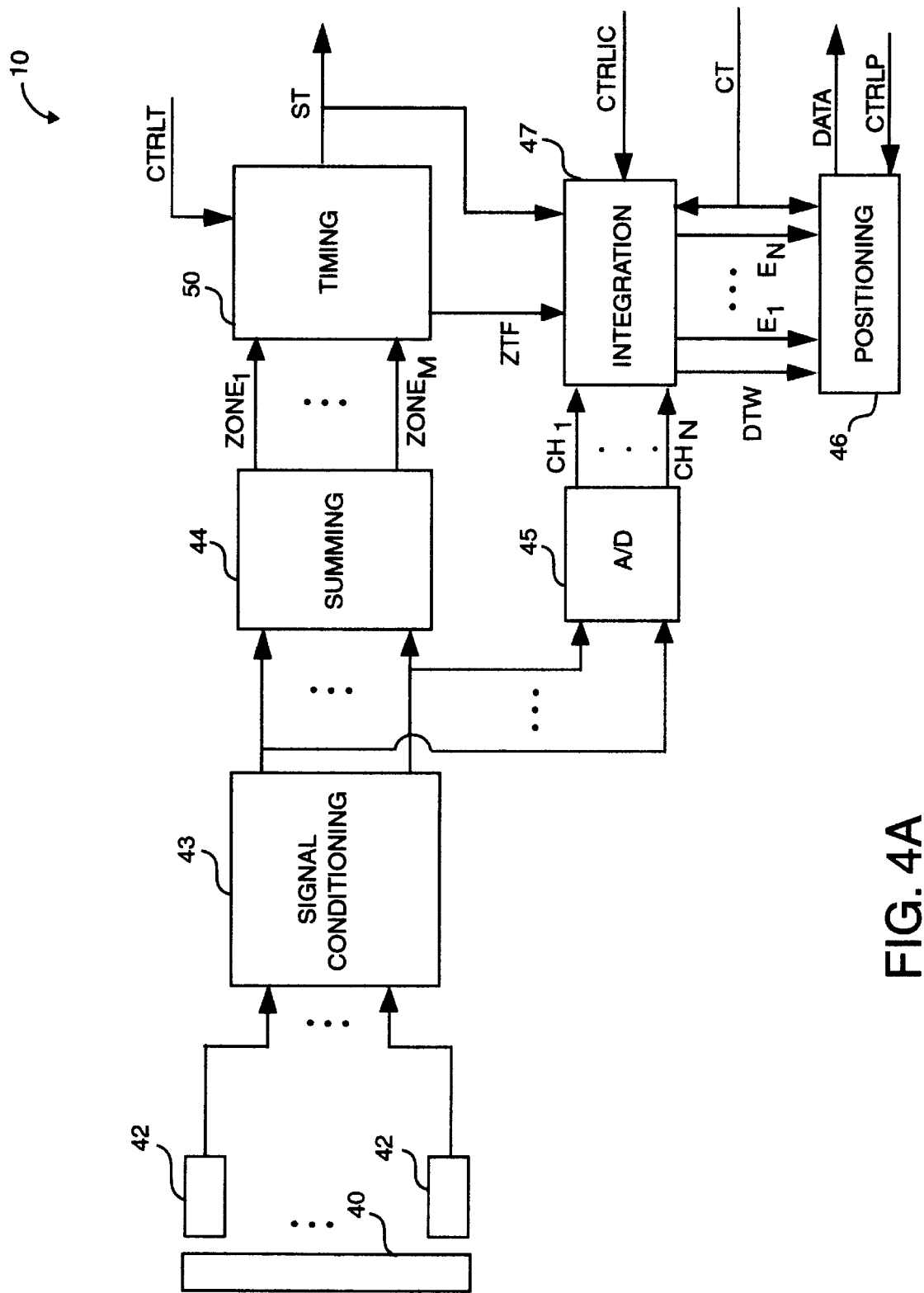
FIG. 4A illustrates the internal components of a detector of the gamma camera system.

FIG. 4A illustrates the internal components of one of the detectors 10, according to one embodiment. The detectors 10 may be assumed to be identical for purposes of the present invention. The detector 10 includes a scintillation crystal 40, such as a NaI(Tl) crystal, which is optically coupled to a number of PMTs 42. The outputs of the PMTs 42 are applied to signal conditioning circuit 43. The signal conditioning circuit 43 provides amplification and normalization of the PMT outputs and, if needed, other types of signal conditioning. The signal conditioning circuit 43 outputs, for each PMT output, a separate amplified signal to both summing network 44 and to analog-to-digital (A/D) circuit 45. The A/D circuit 45 converts the amplified PMT outputs to digital values, which are provided as channel signals $CH_i$ to integration circuitry 47 (i=1, 2, . . . , N, where N is the number of PMTs in the detector).

Generally, integration circuitry 47 integrates event pulses in the channel signals $CH_i$ to produce an integrated energy value $E_i$ for each channel, which is provided to positioning circuitry 46. Integration circuitry 47 also generates a digital trigger word (DTW) signal, which is also provided to positioning circuitry 46. The DTW signal is a multi-bit digital value, i.e., one bit for each PMT in the detector. The state of each DTW bit at any given point in time indicates whether the corresponding PMT is affected by the most recently detected scintillation event based on its integrated energy $E_i$. Integration circuitry 47 also corrects for pre-pulse pile-up and performs pulse tail extrapolation. Integration circuitry 46 may be controlled, at least in part, by integration control signals CTRLIC from processing system 18, which are a subset of the above-mentioned CTRL signals.

Positioning circuitry 46 computes position (x,y) coordinates associated with scintillation events, including determining the peak PMT and centroid for each event, based on the DTW signal and the integrated energy values $E_i$ for the PMT channels. In addition, positioning circuitry may be used to implement the virtual PMT functions, as will be described further below. The computed position data is provided to the processing system 18 via the DATA signal. Positioning circuitry 46 may be controlled, at least in part, by position control signals CTRLP from processing system 18, which are a subset of the CTRL signals.

Figure 5:
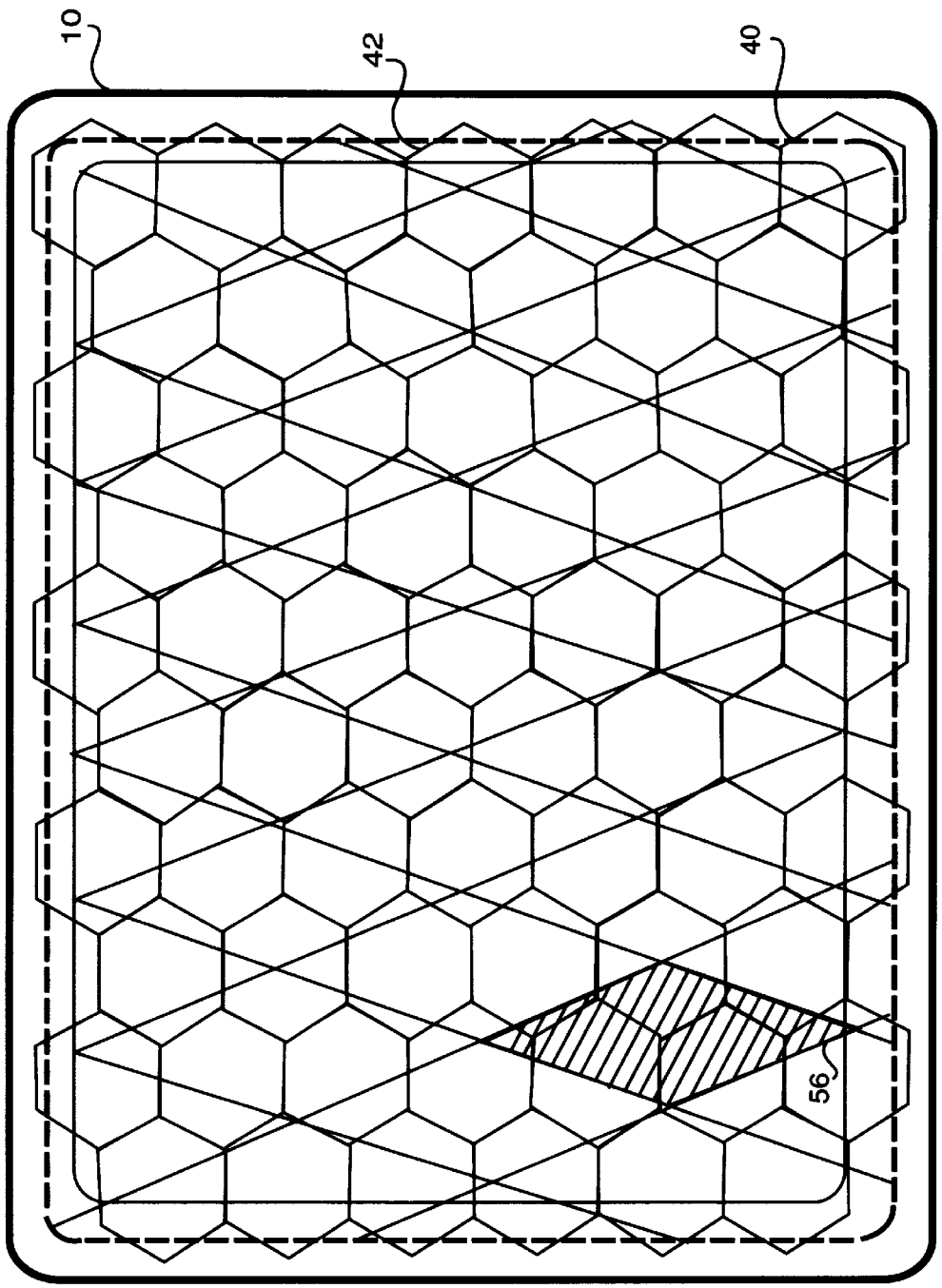
FIG. 5 illustrates a detector imaging surface having a number of zones.

The imaging surface of each of the detectors 10 is divided into a number of timing zones. Each timing zone includes a subset of the array PMTs 42. FIG. 5 illustrates the imaging surface of a detector 10, and an example of how the imaging surface may be divided into timing zones. One timing zone 56 is shaded for purposes of illustration. Note that many variations are possible in the number and shape of the timing zones, for purposes of the present invention. That is, the particular number of zones, zone shapes, and zone arrangements are not germane to the present invention.

Thus, referring again to FIG. 4A, the summing network 44 receives the amplified outputs of the individual PMTs from the signal conditioning circuit 43 and sums the amplified outputs to generate one output $ZONE_j$ for each timing zone (j=1, 2, . . . , M, where M is the number of timing zones on the detector). Summing network 44 then provides each zone output $ZONE_j$ to timing circuitry 50. Timing circuitry 50 applies a signal-level threshold function to the zone outputs $ZONE_j$ and, for the zone outputs $ZONE_j$ that meet the threshold level, generates pulses of singles trigger ST signal. Timing circuitry 50 may be controlled, at least in part, by timing control signals CTRLT from processing system 18, which represent a subset of the CTRL signals. Timing circuitry 50 also generates a zone trigger function (ZTF) signal in response to each scintillation event which meets the threshold level, which is provided to integration circuitry 47. The ZTF signal is a multi-bit digital value, i.e., one bit for each PMT in the detector. The state of each ZTF bit at any given point in time indicates whether the corresponding PMT is affected by the most recently detected scintillation event. Note that while DTW and ZTF contain substantially similar information, ZTF indicates pre-integration trigger status, whereas DTW indicates post-integration trigger status.

Figure 4B:
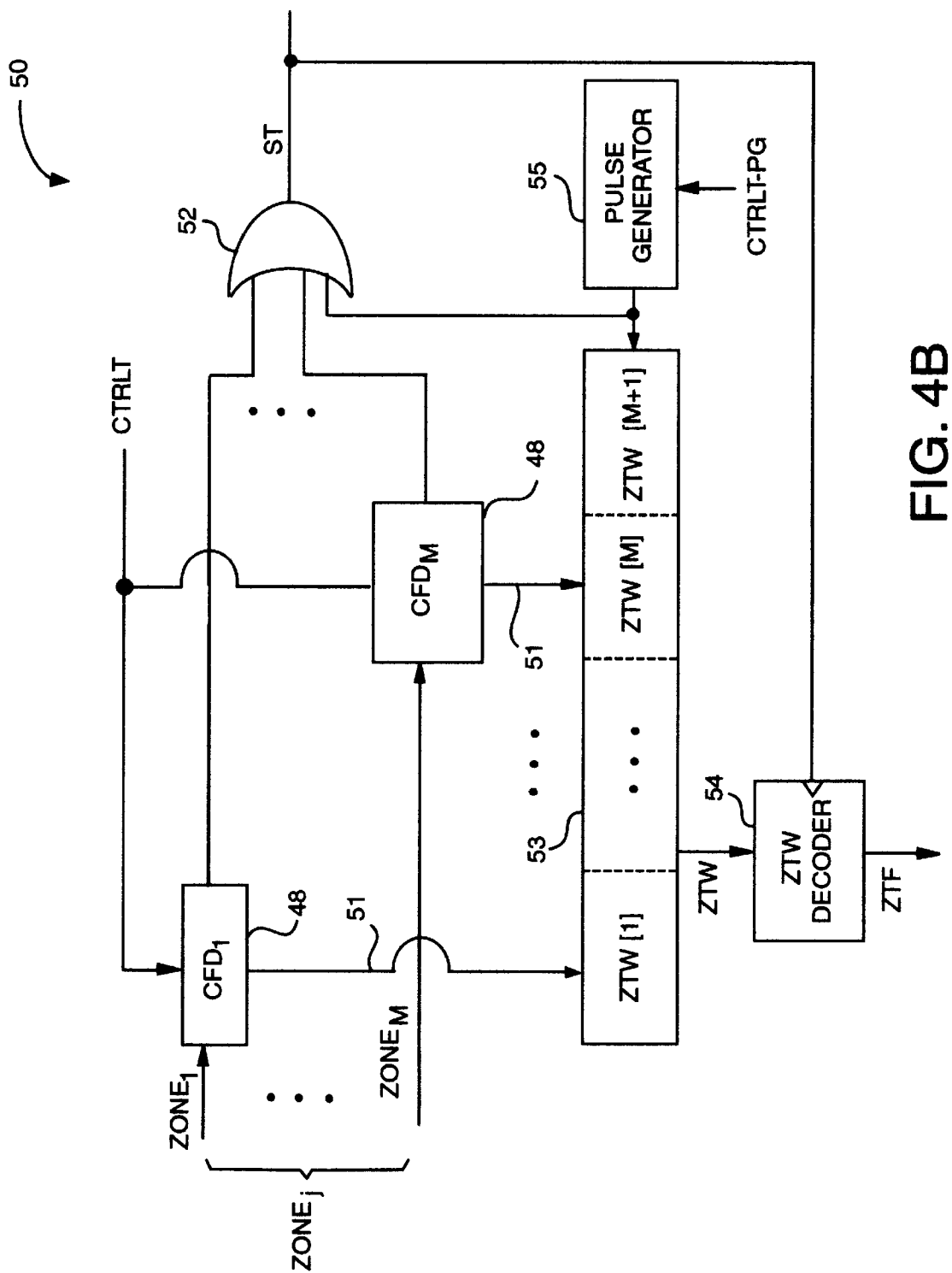
FIG. 4B illustrates the timing circuit of one of the detectors.

FIG. 4B illustrates the timing circuit 50 in greater detail, according to one embodiment. Timing circuitry 50 includes a number of constant fraction discriminators (CFDs) 48, i.e., one CFD 48 for each timing zone. Each of the zone outputs $ZONE_i$ is applied as input to a corresponding CFD 48. The CFDs 48 each provide amplitude independent triggering to maintain tight timing tolerances. The details of the CFDs are not germane to the present invention. Each CFD 48 provides an output signal to an OR gate 52. The output of OR gate 52 is the trigger signal ST from the detector 10, which is applied to CDC 36 (FIG. 3). Each CFD 48 also outputs a signal 51 to ZTW register 49; each such signal 51 determines the state of a corresponding bit of ZTW register 49. Thus, the ZTW register 53 includes one bit for each timing zone, and the states of the ZTW bits identify the particular zones that responded to a scintillation event for each timing cycle. The output ZTW of the ZTW register 53 is applied to ZTW decoder 54. ZTW decoder 54 maps the ZTW value to individual PMTs; that is, ZTW decoder determines which PMT channels are represented by each ZTW value. The mapping function is based on knowledge of which PMTs are included within each timing zone and the well-known light spread function (LSF). The output of ZTW decoder 54 is signal ZTF, which includes one bit for each PMT channel, and which is provided to integration circuitry 47 (FIG. 4A), as noted above.

Figure 6:
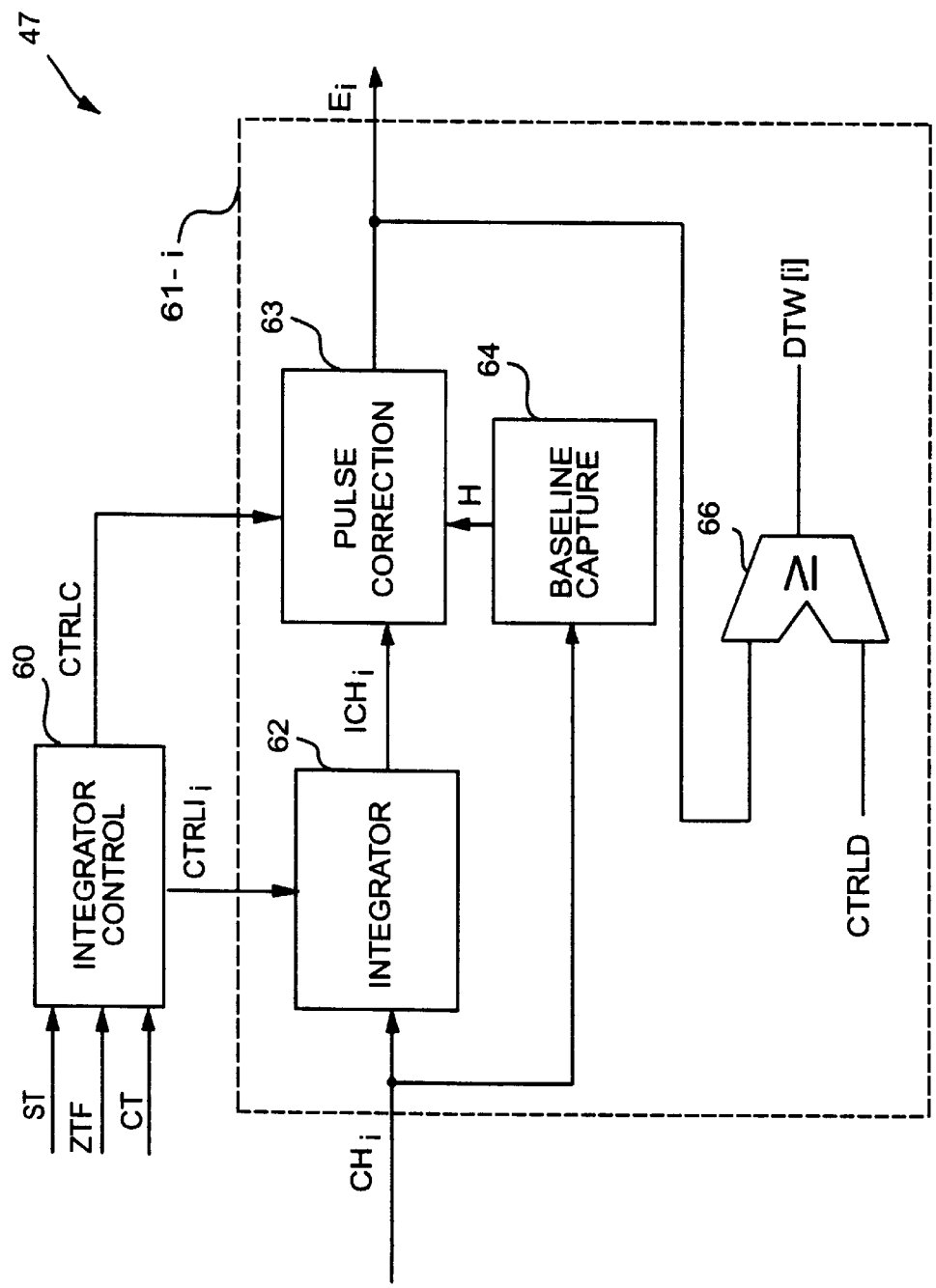
FIG. 6 is a block diagram of the integration circuitry of the gamma camera system.

FIG. 6 illustrates integration circuitry 47 in greater detail. Integration circuitry 47 includes an integrator control circuit 60 and a number of integration/correction circuits 61-$i$, i.e., one for each PMT channel. Only one integration/correction circuit 61-$i$ (i.e., for channel i) is shown in FIG. 6; all such circuits in the detector may be assumed to be identical for purposes of the present invention. As shown, each integration/correction circuit 61 includes an integrator 62, a pulse correction circuit 63, a base line capture circuit 64, and a comparator 66. The integrator control circuit 60 receives as input the singles trigger signal ST, the coincidence trigger signal CT, and the multibit ZTF value. The integrator control circuit 60 provides control signals $CTRLI_i$ to integrator 62 and provides control signal CTRLC to pulse correction circuit 63. Integrator 62 integrates the energy of pulses represented in signal $CH_i$ in response to control signal $CTRLI_i$. Control signal $CTRLI_i$ signals integrator 62 to integrate in response to assertion of the appropriate trigger signal, i.e., coincidence trigger signal CT when the system is configured for coincidence mode imaging and singles trigger signal ST when the system is configured SPECT mode.

As noted above, signal ZTF indicates which particular channels are affected by a given event. Accordingly, in response to the appropriate trigger signal, ST or CT, integrator control 60 provides control signal $CTRLI_i$ to the integrator 62 of the appropriate channels. The integrator 62 of each channel provides an integrated channel signal $ICH_i$ representing the integrated energy of a pulse to the pulse correction circuit 63 of that channel. Pulse correction circuitry 63 performs correction for pre-pulse pile-up and/or performs pulse tail extrapolation. The output of pulse correction circuit 63 is a corrected energy value $E_i$, which is provided to the positioning circuitry 46 (FIG. 4A). Pulse correction circuitry 63 is responsive to control signal CTRLC provided by integrator control circuitry 60, which indicates (at least) the current cycle of the current integration period.

The integration/correction circuit 61-$i$ also includes a baseline capture circuit 64, as noted above. The baseline capture circuit 64 determines the instantaneous energy value of the channel signal $CH_i$ and outputs this value in signal H to pulse correction circuit 63. As will be described in greater detail below, pulse correction circuit 63 computes the tail of a prior pulse for purposes of pre-pulse pile-up correction, or the tail of a current pulse for purposes of pulse tail extrapolation. Integration/correction circuitry 61-$i$ also includes a comparator 66, which applies a digital threshold to the corrected integrated energy value $E_i$ and outputs the result as one bit of the DTW signal. More specifically, comparator 66 causes bit DTW[i] to be asserted when the corrected integrated energy $E_i$ is greater than or equal to the threshold value indicated by control signal CTRLD from processing system 18. The signal DTW is used to indicate each PMT channel's trigger status at the beginning of a valid event condition.

As noted above, the present invention solves the problem of poor position sensitivity near the edge of the detector by defining one ore more non-existent (virtual) PMTs outside the actual field of view of the detector. When a scintillation event occurs under a PMT located near the edge of the field of view, the event is mapped to one or more virtual PMTs located in the vicinity of the event outside the actual field of view. The data value assigned to each virtual PMT is a function of the data value (output signal) of a corresponding real PMT. As a result, a more complete light distribution is available to the centroid algorithm for events occurring near the edge of the field of view, resulting in improved event positioning for those events.

For purposes of implementing the virtual PMTs technique, it may be desirable to have a tradeoff of light output for position sensitivity near the edges of the detector, so that position computations for events occurring near the edges of the detector are not impaired by reflections at the crystal edges. This tradeoff may be achieved in various ways, such as by applying a light absorbing material to the outside of the crystal or by otherwise treating the edge of the crystals to achieve the desired light fall-off.

The virtual PMT technique is based on the assumption that at least some approximate knowledge is available of where an event occurred, prior to performing the centroid calculation. This knowledge may include, for example, knowledge of which PMT is the "peak PMT", i.e., the PMT with the highest output signal value, for the event. Peak PMT determination is already commonly done in gamma camera systems for purposes such as limiting the number of PMTs used in centroid calculation for an event. This knowledge may be used to determine which virtual PMT(s) will be used for an event and on which real PMT(s) the signal value of a virtual PMT will be based. An event may then be localized to a particular location under a peak PMT based on the actual signal value of the real PMT(s). Note, however, that the process of assigning a signal value to a virtual PMT need not be dependent upon which PMT is the peak PMT.

In many systems, for each possible peak PMT a different group of PMTs may be defined for use in the position calculation. If the present technique is applied in such a system, and if these groups are defined so that each virtual PMT is uniquely associated with only one group, then there is a one to one correspondence between peak PMT and virtual PMT. Hence, the assignment to a particular virtual PMT can proceed on the assumption that the event occurred at the peak PMT associated with its group. If it did not, a signal value of the virtual PMT, while possibly very unrealistic, would not be used in the position calculation. One implementation is to assign a signal value to each virtual PMT for each event based on some function of a single specified real PMT, such as the PMT diametrically opposite the virtual PMT from the peak PMT. In addition, if virtual PMTs are only included in the positioning groups of peak PMTs at the edge of the detector, only events approximately one PMT diameter from the edge will be affected; positioning in the center region of the detector will remain unchanged.

In another approach, selection of virtual PMTs and assignment of data values to virtual PMTs may be based on a different method for localizing the event under the peak PMT, as will now be described. As noted above, the integration circuitry 47 generates the multi-bit DTW signal, which contains an indication of which PMTs responded to a particular event. DTW, which is provided to the positioning logic 46, indicates the trigger status of each PMT channel at the beginning of a valid event condition. The trigger data is encoded in DTW according to any suitable encoding scheme. The DTW value may be used for, among other things, localizing the position of an event under the peak PMT, as will now be described.

Figure 7:
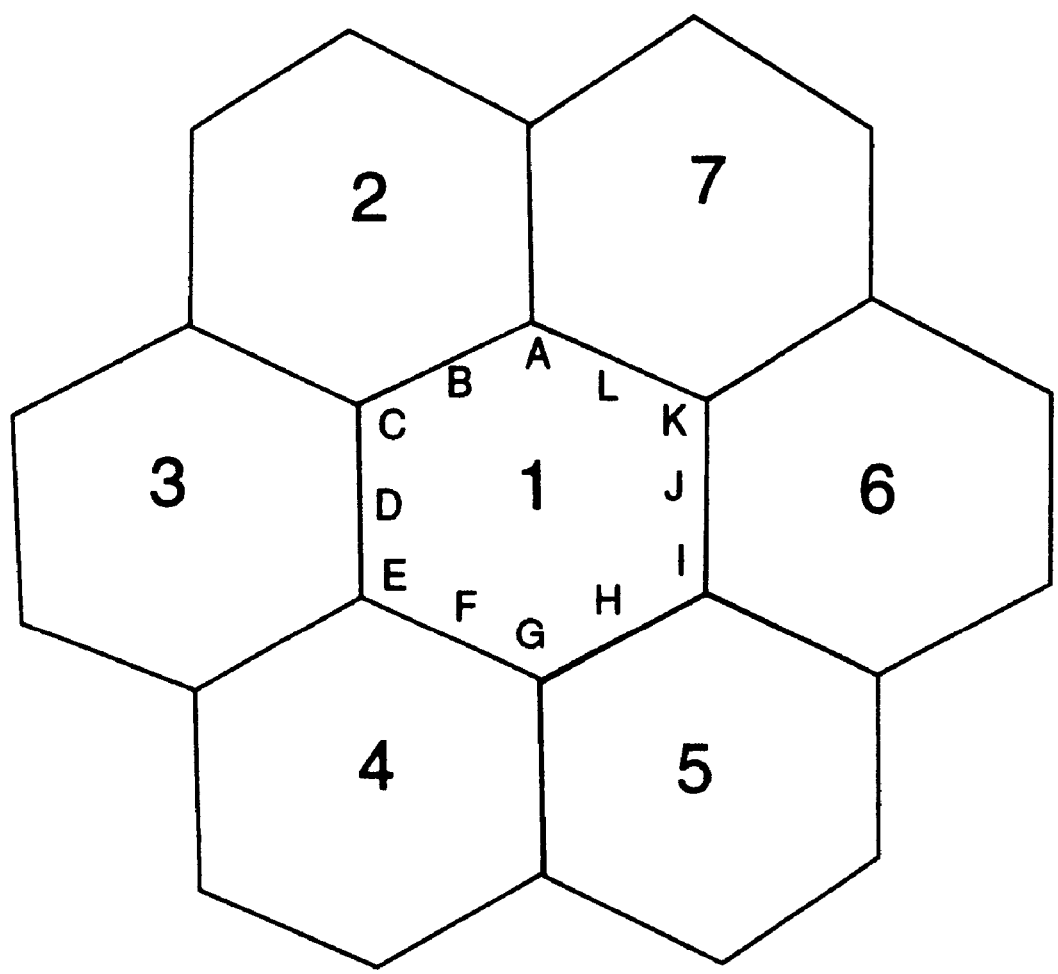
FIG. 7 illustrates a group of seven adjacent PMTs.

Refer now to FIG. 7, which illustrates a group of seven adjacent PMTs according to one possible arrangement. Assume that an event occurring under one of PMTs 1 through 7 may cause a response in one, two or three PMTs. Thus, an event occurring under PMT 1 may occur under the center of PMT 1 or at any of locations A through L. Assume further that an event occurring under the center of PMT 1 will cause a response only in PMT 1. However, an event occurring at point A, for example, will affect PMTs 1, 2 and 7; such an event is therefore referred to as a triple point event. In contrast, an event occurring at point L will only affect PMTs 1 and 7 and may therefore be referred to as a double point event. An event occurring at point K will affect PMTs 1, 6 and 7, and so forth.

FIGS. 8A and 8B illustrate two different examples of possible encodings for DTW. In particular, FIG. 8A illustrates a seven-bit DTW value, in which each bit corresponds to a different one of the seven PMTs in a group of seven adjacent PMTs. Note that seven-bit DTW values such as illustrated in FIGS. 8A and 8B are discussed here to facilitate description; actual DTWs value may include a different number of bits, such as one bit for each PMT in the detector 10. In the example of FIG. 8A, the value of DTW represents an event occurring at location A, which therefore affects PMTs 1, 2 and 7, i.e., bits 0, 1 and 6 of DTW. Alternatively, the status data provided in DTW may be encoded to be more compact, as illustrated by example in FIG. 8B. In the example of FIG. 8B, DTW is a seven-bit value in which the three leftmost bits form a binary value indicating which of the seven adjacent PMTs is the peak PMT. The four rightmost bits form a binary value indicating at which of locations A through L (or the center of the PMT) under the peak PMT the event occurred. Note that while the encoding scheme of FIG. 8B does not reduce the number of bits used compared to that of FIG. 8A, it may be a more effective approach when a large number of PMT channels is used (e.g. 96 or 55).

Once a DTW value is generated, it can be used to reference into a look-up table to determine which particular PMT channels should be used for the position calculation. In addition, the DTW value may be used to identify event that occur near the edge of the field of view to determine when virtual PMTs should be used, and to identify which virtual PMTs should be used. Further, the DTW value may be used to determine the precise location of an event under the peak PMT, as illustrated by the following table. The following table provides an example of a mapping of possible DTW values to precise event locations under a peak PMT, for a given group of seven adjacent PMTs, using the simple encoding scheme of FIG. 8A.

| DTW [7] | DTW [6] | DTW [5] | DTW [4] | DTW [3] | DTW [2] | DTW [1] | Event Location |
|---|---|---|---|---|---|---|---|
| 0 | 0 | 0 | 0 | 0 | 0 | 1 | center |
| 0 | 0 | 0 | 0 | 0 | 1 | 1 | B |
| 0 | 0 | 0 | 0 | 1 | 0 | 1 | D |
| 0 | 0 | 0 | 1 | 0 | 0 | 1 | F |
| 0 | 0 | 1 | 0 | 0 | 0 | 1 | H |
| 0 | 1 | 0 | 0 | 0 | 0 | 1 | J |
| 1 | 0 | 0 | 0 | 0 | 0 | 1 | L |
| 0 | 0 | 0 | 0 | 1 | 1 | 1 | C |
| 1 | 0 | 0 | 0 | 0 | 1 | 1 | A |
| 0 | 0 | 0 | 1 | 1 | 0 | 1 | E |
| 0 | 0 | 1 | 1 | 0 | 0 | 1 | G |
| 0 | 1 | 1 | 0 | 0 | 0 | 1 | I |
| 1 | 1 | 0 | 0 | 0 | 0 | 1 | K |

Thus for a 96 PMT detector for example, having PMTs arranged as shown in FIG. 7, the number of valid combinations is given by 96×13 (i.e., 13 possible event locations under the peak PMT), or 1248 combinations, excluding edges. If edges are included, the number of valid combinations will decrease according to the ratio of edge PMTs to total PMTs. For example, if a 96 PMT detector has 36 edge PMTs, where four PMTs are on the corner of the detector, the number of valid combinations may be reduced by approximately 32% to 780 valid combinations.

Figure 9A:
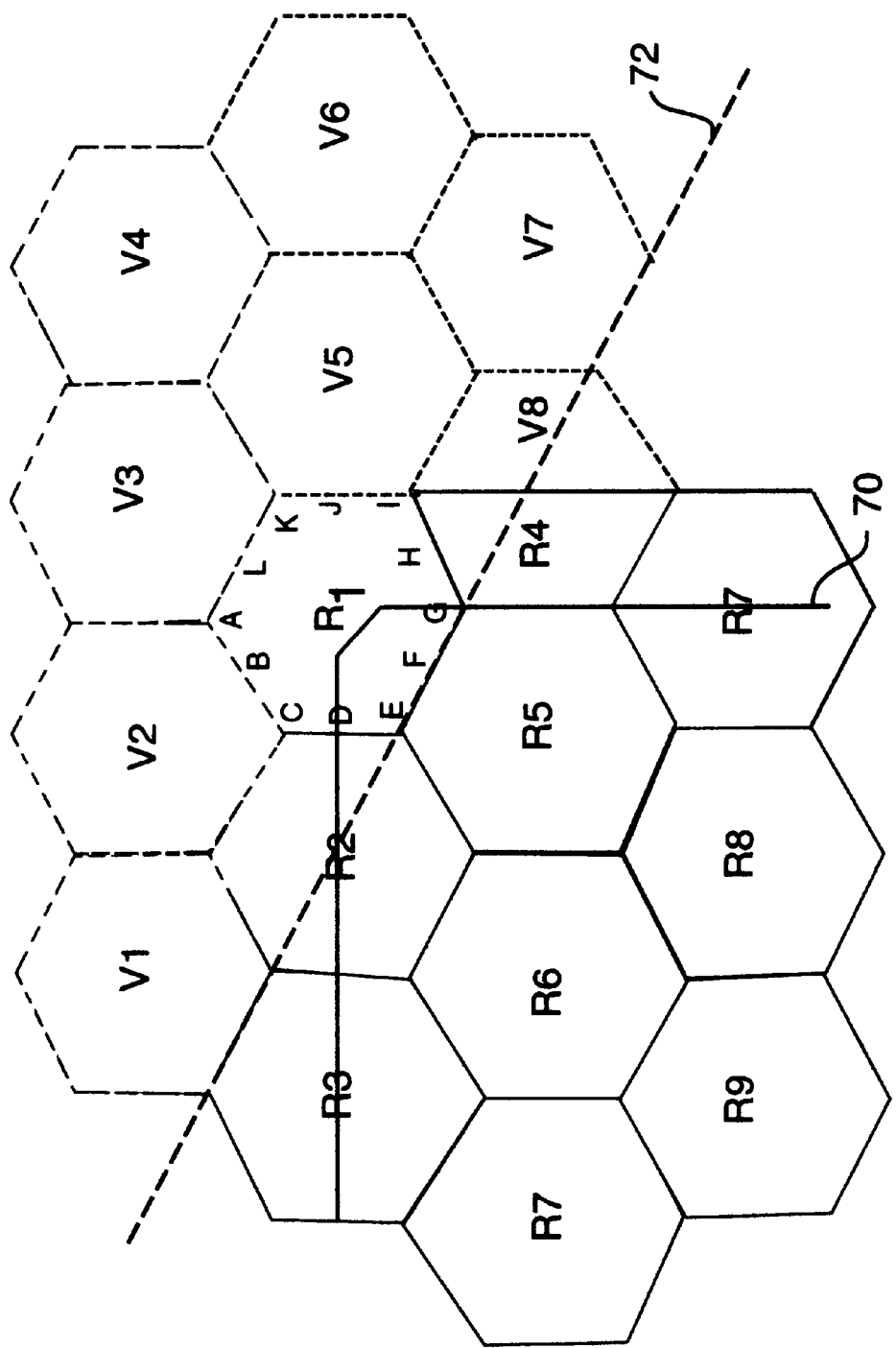
FIG. 9A illustrates a number of virtual PMTs defined outside the field of view of the detector.

Generation of virtual PMT data values may be carried out by the positioning circuitry 46. When an event is recorded by a peak PMT located near the edge of the field of view, the virtual PMTs for that event can be selected and given appropriate data values based generally on a symmetry about one or more axes defined relative to the peak PMT. For example, referring to FIG. 9A, a number of real PMTs R1 through R9 are shown, as are the locations of a number of virtual PMTs V1 through V7. PMT R1 represents the corner PMT, which partially overlaps the edge of the scintillation crystal 70. Assume that a scintillation event occurs at point F, such that PMT R1 is the peak PMT for that event. Hence, in one implementation, a line of symmetry 72 is defined to pass through the edge of PMT R1 that is closest to point F and parallel to the edge. Virtual PMTs V1 through V7 may then be assigned data values that are based on the data (output signal) values of the real PMTs that are directly opposite them, relative to line of symmetry 72. For example, PMT V2 may be assigned a data value based on that of PMT R6, PMT V5 may be assigned a data value based on that of PMT R7, and PMT V3 may be assigned a data value based on that of PMT R8. Note that the actual number of PMTs (real or virtual) used in the position calculation for a given event depends on the implementation. Thus, the virtual PMTs can then be considered part of the dataset that is used for positioning and energy computation, just as if they represented real PMT channels. Note that FIG. 9A illustrates only one way of defining a line of symmetry 72; other approaches are possible. For example the line of symmetry 72 might instead be defined to pass through the center of the peak PMT, regardless of the precise location of the event.

The data value assigned to each virtual PMT for an event may be computed as a function of the signal value of a corresponding real PMT. It may be desirable that such function take into account the precise location under the peak PMT at which the event occurred. For example, for an occurring near the edge of the detector, the signal value assigned to a virtual PMT should be larger the closer the event is to the edge. In contrast, the signal value of the real PMT upon which that virtual PMT's signal value is based will generally be lower the closer the event is to the edge. This effect is a result, at least in part, of the known light spread function, as illustrated in FIG. 9B.

Figure 9B:
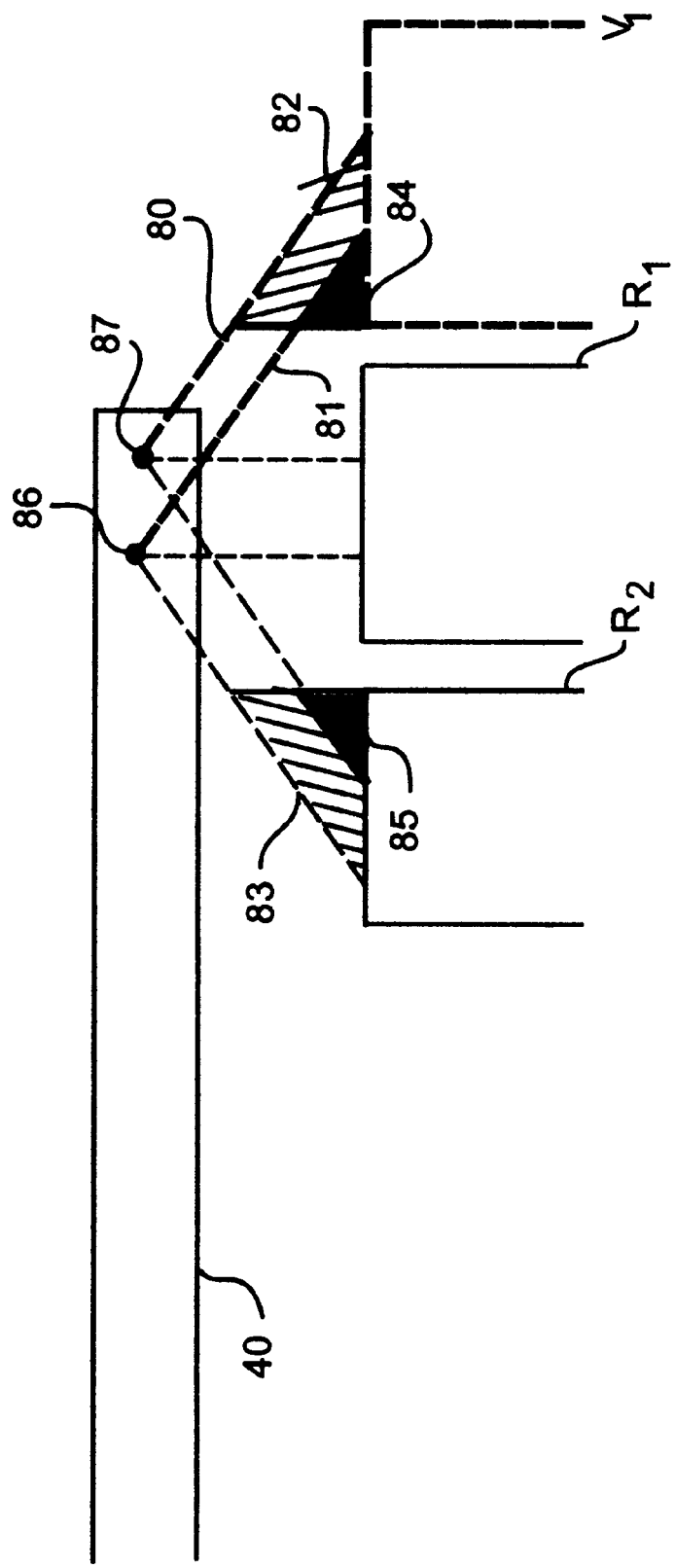
FIG. 9B illustrates the relationship between the signal value of a real PMT and the signal value of a corresponding virtual PMT for different event locations.

FIG. 9B shows a scintillation crystal 40, two real PMTs R1 and R2, and a virtual PMT V1. For an event occurring at location 87 within the crystal, the light spread function is represented by dashed lines 80. For this event, the area of shaded region 82 corresponds to the magnitude of the signal assigned to virtual PMT V1, while the area of shaded region 85 corresponds to the magnitude of the signal assigned to real PMT. In contrast, for an event occurring at location 86, i.e., farther from the edge of the crystal, the light spread function is represented by dashed lines 81. For this event, the area of shaded region 84 corresponds to the magnitude of the signal assigned to virtual PMT V1, while the area of shaded region 83 corresponds to the magnitude of the signal assigned to real PMT. Thus, a larger signal value for real PMT R2 should result in a lower signal value for virtual PMT V1.

Figure 9C:
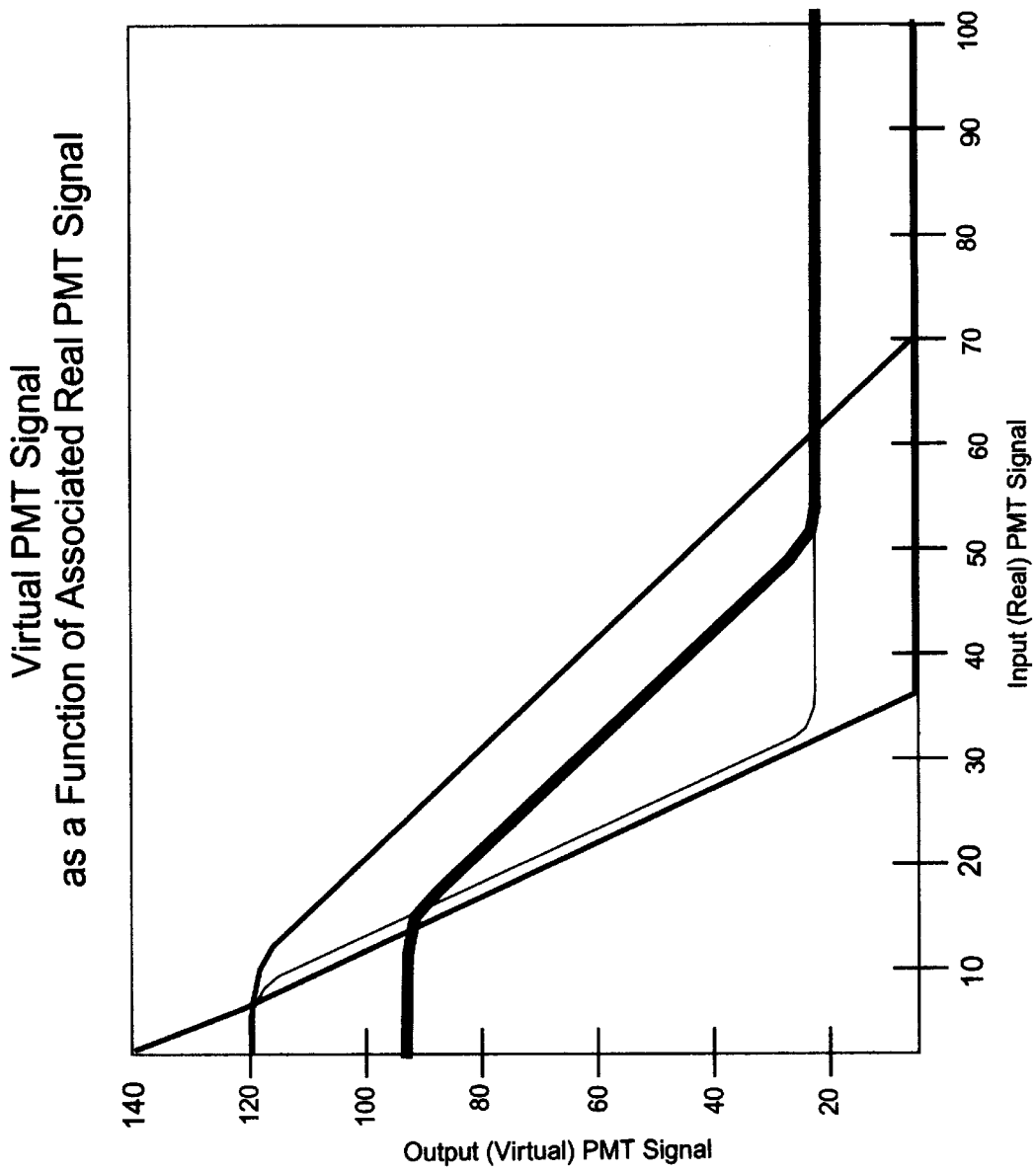
FIG. 9C shows several examples of curves representing virtual PMT signal value as a function of real PMT signal value.

Thus, given the light spread function, the signal value of a virtual PMT generally may be determined as a monotonically decreasing function of the signal value of the real PMT upon which it is based. FIG. 9C shows several examples of such functions which may be suitable. Note that while the functions shown in FIG. 9C are illustrative, many variations upon these functions can be implemented within the scope of the present invention. The particular function(s) used will depend upon the specific implementation of the detector, including the arrangement, sizes, and spacing of PMTs. It may be desirable not to affect the resolution at positions on the detector where the resolution is normally acceptable. To accomplish this, a function representing virtual PMT output value vs. real PMT output value may be designed to be flat (i.e. a substantially horizontal line), as shown in FIG. 9, until the point at which the real PMT input value decreases enough to cause the corresponding event position resolution to deteriorate. At that point, the function may become linear, with an integer (negative) slope to eliminate sampling effects. If the slope is large in magnitude, the intersection point may need to be smoothed to avoid a sharp discontinuity in the shape of the position peak. Note that there may be an inverse relationship between virtual PMT signal value and corresponding real PMT signal value, although that is not necessarily the case.

Certain other considerations should be noted in connection with implementing virtual PMTs. It may be desirable to implement the above-mentioned function in the form of a look-up table, as will be further described below. It may also be desirable to choose the maximum allowable virtual PMT signal value to be significantly smaller than the smallest realistic signal from a real peak PMT, so that a virtual PMT is not erroneously chosen as the peak PMT. In certain implementations this might result in rejection of the event. In order to compensate for low virtual PMT values as a result of the foregoing consideration, the positions of virtual PMTs may be defined to be farther out from the detector edge than positions at which an adjacent column of real PMTs would be placed. In addition, it may be desirable to eliminate sampling effects in the input PMT distribution (i.e., the distribution in signals from the real PMT used as input to the look-up table that outputs the virtual PMT signal) due to digital gain calibration, to avoid multiple peaks in the position spectrum at a given event location. Further, it may not be desirable to apply digital gain factors to the integrated PMT data, i.e., such digital gain factors can be set to one. Pre-digitization gain adjustments may be used to compensate for gain variations.

Figure 10:
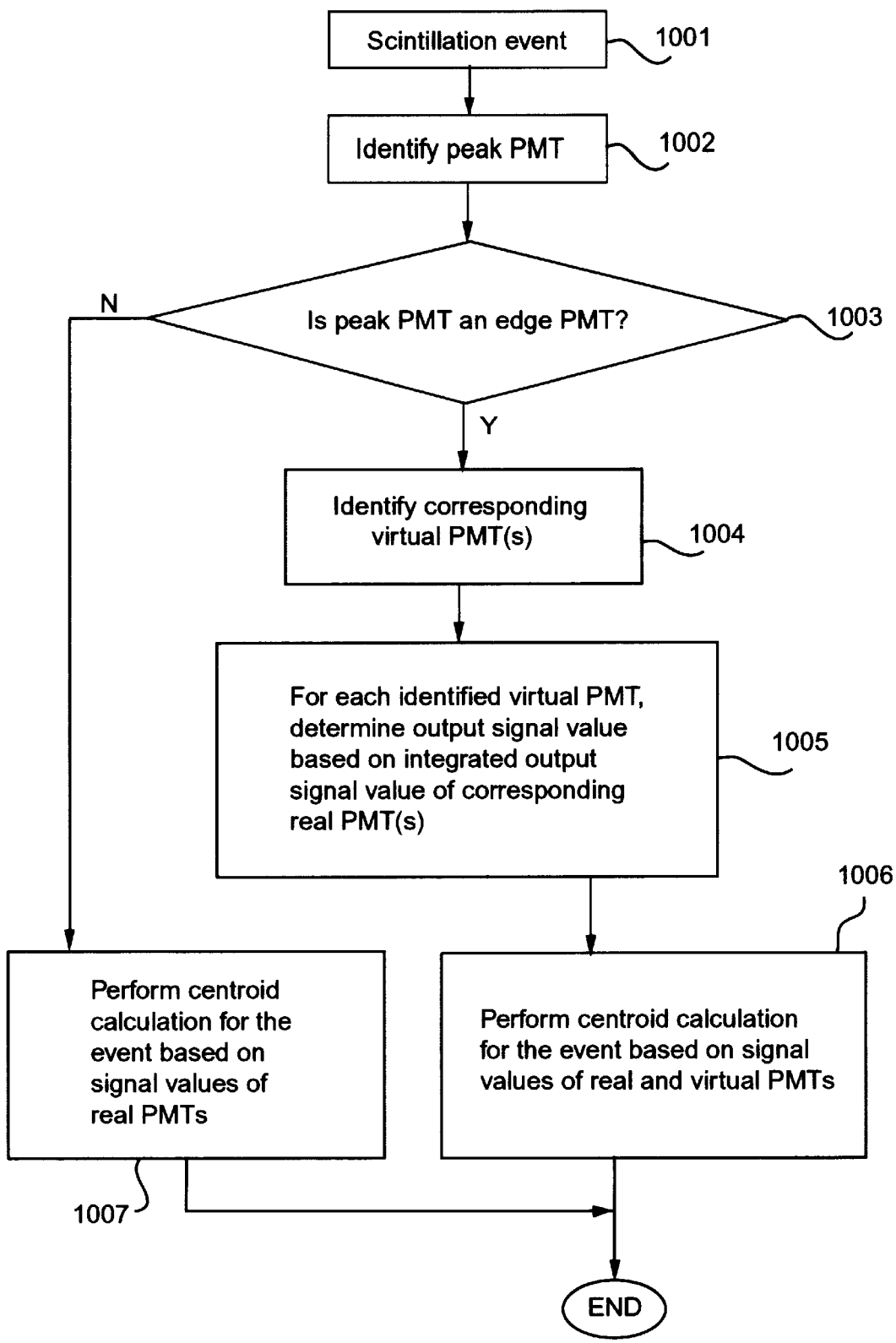
FIG. 10 is a flow diagram of a routine for determining the position of a scintillation event based on real and virtual PMTs.

FIG. 10 illustrates a routine for determining the position of a scintillation event using both real and virtual PMTs, according to one embodiment. In response to a scintillation event at 1001, the peak PMT for that event is identified at 1002. Next, at 1003 it is determined whether the peak PMT is an edge PMT, i.e., a PMT located sufficiently close to the edge of the field of view that the use of virtual PMTs is desirable. If the peak PMT is determined not to be an edge PMT, then the routine proceeds to 1007, where the centroid calculation is performed for the event based only on the signal values of the real PMTs affected by the event. If the peak PMT is an edge PMT, then at 1004, one or more virtual PMTs corresponding to the peak PMT are identified using a suitable mapping function, such as described above. At 1005, for each identified virtual PMT, the output signal value to be assigned to the virtual PMT is determined based on the integrated output signal value of one or more corresponding real PMTs. The identity of the corresponding real PMT(s), the virtual PMT signal values, or both, may be determined from one or more look-up tables. After determining the signal values of the virtual PMTs, the centroid calculation is performed for the event at 1006 based on the signal values of both the real PMTs affected by the event and the selected virtual PMTs.

Figure 11:
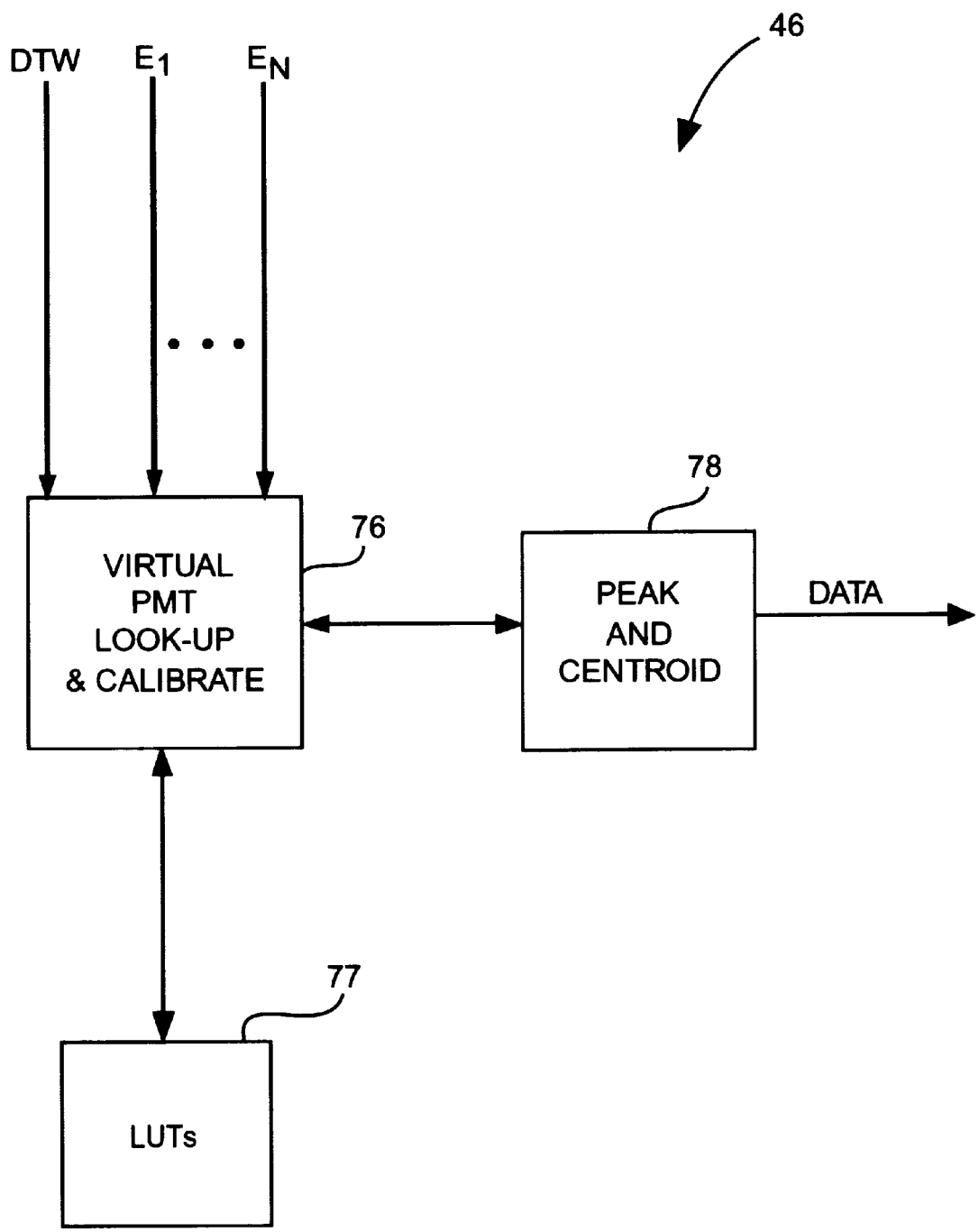
FIG. 11 is a block diagram illustrating components of the positioning circuitry according to one embodiment.

Thus, both real PMT signal values and virtual PMT data values are used in the position calculations for events occurring near the edge of the detector. FIG. 11 illustrates the positioning circuitry 46 in greater detail, according to one embodiment.

As illustrated, the positioning circuitry 46 includes a virtual PMT look-up and calibration module 76, a peak PMT/centroid determination module 78, and one or more look-up tables 77. The look-up table(s) 77 may be stored in any suitable storage medium. The look-up table(s) 77 include values representing the virtual PMT signal value vs. real PMT signal value functions and, optionally, values for calibration of gain and/or offset variations among PMTs. During imaging, for a given event the virtual PMT look-up and calibration module 76 receives the DTW value and the integrated energy values $E_i$ of certain PMT channels and performs any necessary calibrations such as gain and offset and passes the calibrated PMT energy signals to the peak PMT/centroid determination module 78. Module 78 determines which PMT is the peak PMT and passes this information back to the look-up and calibration module 76. The look-up and calibration module 76 then looks up the appropriate virtual PMT values based on the peak PMT information and passes that information back to the peak PMT/centroid determination module 78, for centroid determination. The centroid information is then passed to the processing system 18 via the DATA signals.

Figure 12:
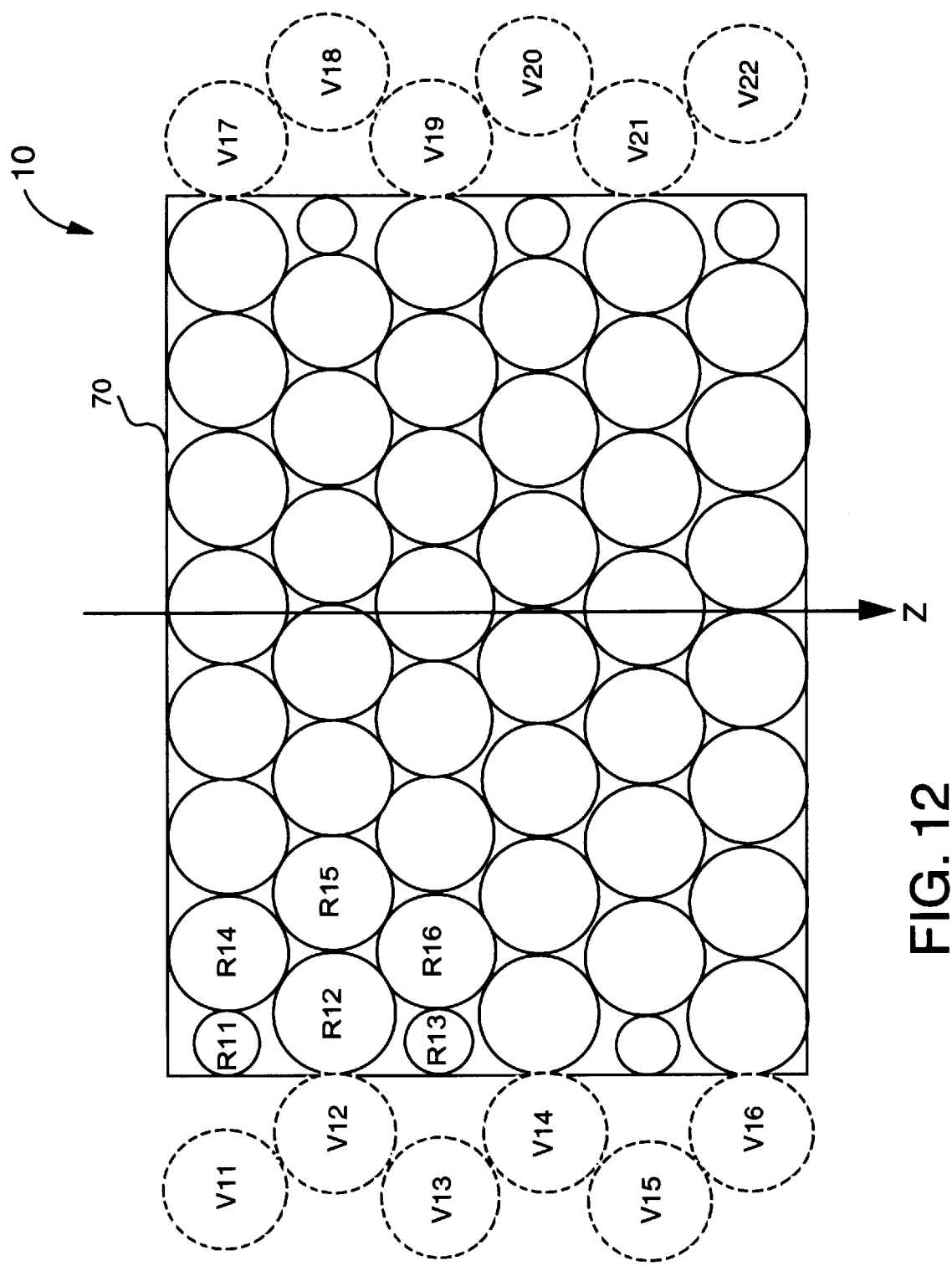
FIG. 12 illustrates a number of virtual PMTs defined outside the field of view of the detector, according to another embodiment.

Referring now to FIG. 12, another embodiment of a detector which makes use of virtual PMTs is shown. In the illustrated embodiment, the detector 10 includes a crystal 70 and 42 round, relatively large diameter (e.g., 2.5") PMTs in a close packed hexagonal array, with six round, relatively small diameter (e.g., 1.5") PMTs filling in the resulting spaces on the transverse edges of the detector. It is desirable to reduce the gaps due to unusable areas along the transverse edges of the detector (i.e. the edges parallel to the Z axis), while leaving positioning at the axial edges (the edges perpendicular to the Z axis) unchanged. Accordingly, in the illustrated embodiment, a column of six virtual PMTs is defined along each transverse edge of the detector 10. In particular, virtual PMTs V11 through V16 are defined along the left transverse edge, and virtual PMTs V17 through V22 are defined along the right transverse edge.

When a real PMT located along one of the transverse edges is determined to be the peak PMT, then the virtual PMT directly opposite the peak PMT is assigned a data value that is based upon the output signal value of the real PMT that is one PMT closer to the center of the detector. For example, if real PMT R11 is the peak PMT, then virtual PMT V11 is given a signal value based on the signal value of real PMT R14. Similarly, if PMT R12 is the peak PMT, then virtual PMT V12 is assigned a signal value based upon that of real PMT R15. Thus, in the embodiment of FIG. 12, only one virtual PMT is assigned for each particular peak PMT.

One or more of the functions illustrated in FIG. 9C, discussed above, may be suitable for use with the embodiment of FIG. 12. Note that the function used to generate virtual PMT data values may be dependent, at least in part, on the defined position of a given virtual PMT relative to the peak PMT. In particular, the distance between the location of an event and the real PMT whose signal value is used (to generate a virtual PMT data value) depends upon the diameter of the peak PMT. That is, the diameters of the PMTs determines how closely together the PMTs can be packed. Consequently, it may be desirable to use a different function for each size of PMT that can be a peak PMT. Thus, in the embodiment of FIG. 12, a different function may be used when the peak PMT is one of the smaller diameter PMTs, such as PMT R11, than when the peak PMT is one of the larger diameter PMTs, such as PMT R12. Accordingly, if look-up tables are used to implement the virtual PMTs, it may be desirable to use multiple look-up tables to implement multiple functions, e.g., one for each PMT size.

Note that if look-up tables are used, it may not be necessary to create a separate look-up table or tables for purposes of assigning virtual PMT data values, since such tables may already be provided for purposes of digital gain, offset calibration, or other commonly performed functions. Thus, it may be possible to combine the virtual PMT look-up function with such other functions. In a simple embodiment, a look-up table for a given virtual PMT might simply store the possible virtual PMT signal values for all possible digital values of the output signal of an associated real PMT. In that case, each virtual PMT signal value may include the aforementioned scale factor to adjust for PMT positioning, light spread function, etc. In addition, the table values may be selected to mitigate undesired digital sampling effects and other problems. It may also be desirable to prevent a virtual PMT from being selected as the peak PMT for any event. Depending upon the implementation, it may or may not be desirable to allow a virtual PMT to contribute to positioning computations for more than one peak PMT.

Thus, a method and apparatus for detecting scintillation events in a gamma camera detector using virtual photomultiplier tubes (PMTs) have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of detecting a scintillation event, the method comprising:
    identifying a real light-responsive element responding to the scintillation event;
    mapping the scintillation event to a virtual light-responsive element; and
    using data representing a response of the real light-responsive element and data representing a response of the virtual light-responsive element to represent the scintillation event.

2. A method as recited in claim 1, further comprising using the data representing the response of the real light-responsive element to generate the data representing the response of the virtual light-responsive element.

3. A method as recited in claim 1, further comprising using data representing the scintillation event, including the data representing the response of the real light-responsive element and the data representing the response of the virtual light-responsive element, to generate image data of an object.

4. A method as recited in claim 1, wherein the virtual light-responsive element is a component of a radiation detector and is defined outside a field of view of the detector.

5. A method as recited in claim 4, wherein said mapping comprises mapping the scintillation event to the virtual light-responsive element in response to identifying the real light responsive element as being close to the edge of the field of view.

6. A method as recited in claim 1, wherein the real light responsive element comprises a photomultiplier element.

7. A method as recited in claim 1, further comprising:
    determining a location of the event relative to the real light responsive element; and
    wherein said mapping comprises mapping the event to the virtual light responsive element based on the location.

8. A method of detecting events in an imaging system, the imaging system including a scintillation detector having a plurality of real light-responsive elements, the method comprising:

identifying a real light-responsive element affected by a scintillation event;

mapping the scintillation event to a virtual light-responsive element based on the identified real light-responsive element;

generating first data associated with the scintillation event based on a response of the real light-responsive element; and using the first data to generate second data associated with the scintillation event and the virtual light-responsive element.

9. A method as recited in claim 8, wherein the virtual light-responsive element is defined outside a field of view of the detector.

10. A method as recited in claim 9, wherein the scintillation event is an event occurring near the edge of the field of view.

11. A method as recited in claim 8, wherein said mapping comprises mapping the scintillation event to the virtual light-responsive element in response to identifying the real light responsive element as being close to the edge of a field of view of the detector.

12. A method as recited in claim 8, further comprising:

determining a location of the event with respect to the real light-responsive element;

wherein said mapping comprises mapping the event to the virtual light-responsive element based on the location.

13. A method as recited in claim 8, further comprising using the first data and the second data to generate image data of an object.

14. A method as recited in claim 8, wherein the real light responsive element comprises a photomultiplier tube.

15. A method as recited in claim 8, further comprising determining a peak light-responsive element for the scintillation event, wherein the second data represents a response of the virtual light-responsive element, and wherein said using the first data to generate the second data comprises generating the second data as a function of a localized position of the scintillation event relative to the peak light-responsive element.

16. A method as recited in claim 8, wherein the first data represents a response of the real light-responsive element, wherein the second data represents a response of the virtual light-responsive element, and wherein said using the first data to generate the second data comprises generating the second data according to an inverse relationship between the first data and the second data.

17. A method of detecting events in a gamma camera system, the gamma camera system including a detector, the detector including a plurality of real photomultiplier tubes (PMTs), the method comprising:

defining a plurality of virtual PMTs outside an actual field of view of the detector;

identifying a peak PMT of a subset of the PMTs responding to a scintillation event occurring near an edge of the actual field of view;

mapping the event to a subset of the virtual PMTs based on the identified peak PMT;

for each virtual PMT of the subset of virtual PMTs, assigning the virtual PMT a data value based on a data value of a corresponding one or more of the real PMTs; and using data values associated with the subset of the real PMTs and the subset of the virtual PMTs to generate position data of the event to increase an effective field of view of the detector.

18. A method as recited in claim 17, wherein said assigning the virtual PMT a data value based on a data value of a corresponding one or more of the real PMTs comprises assigning the data value of the virtual PMT according to a monotonically decreasing function of the data value of the corresponding one or more of the real PMTs.

19. A method as recited in claim 17, further comprising determining a location of the event under the peak PMT, wherein said mapping comprises selecting the subset of the virtual PMTs based on the location of the event under the peak PMT.

20. A method as recited in claim 17, further comprising determining a location of the event under the peak PMT, wherein said assigning the virtual PMT a data value comprises assigning the virtual PMT a data value as a function of the location.

21. A medical imaging system comprising:

a plurality of real light-responsive elements;

means for defining a plurality of virtual light-responsive elements;

means for mapping a scintillation event to a subset of the virtual light-responsive elements; and means for using data representing responses of a subset of the real light-responsive elements responding to the scintillation and data representing responses of the subset of the virtual light-responsive elements to represent the scintillation event.

22. A medical imaging system as recited in claim 21, further comprising means for using the data representing responses of the subset of real light-responsive elements to generate the data representing responses of the subset of virtual light-responsive elements.

23. A medical imaging system as recited in claim 21, further comprising means for determining a localized position of the scintillation event relative to a peak light-responsive element, wherein the means for using the data representing responses of the subset of real light-responsive elements to generate the data representing responses of the subset of virtual light-responsive elements comprises means for generating data representing the response of a virtual light-responsive element as a function of the localized position.

24. A medical imaging system as recited in claim 21, wherein the means for using the data representing responses of the subset of real light-responsive elements to generate the data representing responses of the subset of virtual light-responsive elements comprises means for generating data representing a response of a virtual light responsive element based on data representing a response of a corresponding real light-responsive element based on an inverse relationship between the response of a virtual light responsive element and the response of the corresponding real light responsive element.

25. A medical imaging system as recited in claim 21, further comprising means for using the data representing the scintillation event to generate image data of an object to be imaged.

26. A medical imaging system as recited in claim 21, further comprising means for defining the virtual light-responsive elements near an edge of a field of view of the detector.

27. A medical imaging system as recited in claim 21, wherein said means for mapping comprises means for mapping the event to the subset of virtual light-responsive elements based on the subset of real light-responsive elements identified as responding to the scintillation event.

28. A medical imaging system as recited in claim 21, wherein the plurality of real light responsive elements comprises a plurality of photomultiplier tubes (PMTs).

29. A gamma camera detector comprising:

a plurality of real photomultiplier elements;

means for identifying which of the real photomultiplier elements are affected by a scintillation event;

means for mapping the scintillation event to one or more virtual photomultiplier elements;

means for generating first data associated with the scintillation event based on responses of the real photomultiplier element(s) affected by the scintillation event; and means for using the first data to generate second data associated with the scintillation event for the virtual photomultiplier element(s).

30. A medical imaging system as recited in claim 29, wherein the means for using the first data to generate second data comprises means for generating data representing a response of a virtual light-responsive element based on an inverse function of a data representing a response of a real light-responsive element.

31. A gamma camera detector as recited in claim 29, further comprising means for defining the virtual photomultiplier elements outside a field of view of the detector.

32. A gamma camera detector as recited in claim 29, wherein the means for mapping comprises means for mapping the event to the virtual photomultiplier element(s) based on the real photomultiplier element(s) identified as affected by the scintillation event.

33. A gamma camera detector as recited in claim 29, further comprising means for using the first data and the second data to generate image data of an object.

34. A gamma camera detector as recited in claim 29, further comprising means for determining a location of the event under a peak PMT, wherein said mapping comprises mapping the event to a subset of the virtual PMTs based on the location of the event under the peak PMT.

35. A nuclear medicine imaging system including a radiation detector, the radiation detector comprising:

a scintillator;

a plurality of real light-responsive elements for detecting scintillation events occurring within the scintillator;

timing circuitry coupled to outputs of the real light-responsive elements and configured to generate a trigger signal in response to at least one of the real light-responsive elements indicating the occurrence of a scintillation event;

integration circuitry coupled to the outputs of the real light-responsive elements and configured to integrate the outputs;

positioning circuitry coupled to the timing circuitry and the integration circuitry and configured to compute a position of the scintillation event in response to the trigger signal based on data values associated with a subset of the real light-responsive elements and a subset of a plurality of virtual light responsive elements, including:

identifying a light-responsive element responding to the event;

identifying a virtual light-responsive element based on the identified light-responsive element; and assigning the identified virtual light-responsive element a data value based on a data value of a corresponding identified real light-responsive element responding to the event, wherein the data values of the virtual light-responsive element and the corresponding one of the light-responsive elements are for use by the positioning circuit in determining the position of the scintillation event.

* * * * *